US010469233B2

United States Patent
Guzelgoz et al.

(10) Patent No.: US 10,469,233 B2
(45) Date of Patent: *Nov. 5, 2019

(54) METHODS AND APPARATUS FOR PROVIDING SOFT AND BLIND COMBINING FOR PUSCH ACKNOWLEDGEMENT (ACK) PROCESSING

(71) Applicant: Cavium, LLC, Santa Clara, CA (US)

(72) Inventors: Sabih Guzelgoz, San Jose, CA (US); Hong Jik Kim, San Jose, CA (US); Tejas Maheshbhai Bhatt, Sunnyvale, CA (US); Fariba Heidari, San Jose, CA (US)

(73) Assignee: Cavium, LLC, Santa Clara, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/378,750

(22) Filed: Dec. 14, 2016

(65) Prior Publication Data

US 2017/0170930 A1 Jun. 15, 2017

Related U.S. Application Data

(60) Provisional application No. 62/267,221, filed on Dec. 14, 2015.

(51) Int. Cl.
*H04L 5/00* (2006.01)
*H04L 1/16* (2006.01)
(Continued)

(52) U.S. Cl.
CPC ........ *H04L 5/0055* (2013.01); *H04L 1/0026* (2013.01); *H04L 1/0035* (2013.01);
(Continued)

(58) Field of Classification Search
CPC ... H04L 5/0055; H04L 1/0026; H04L 1/0035; H04L 1/1664; H04L 5/0057;
(Continued)

(56) References Cited

U.S. PATENT DOCUMENTS

2008/0253318 A1* 10/2008 Malladi ................. H04L 1/0026
370/328
2014/0177586 A1* 6/2014 Jang ..................... H04L 5/0053
370/329
(Continued)

*Primary Examiner* — Hardikkumar D Patel
(74) *Attorney, Agent, or Firm* — James M. Wu; JW Law Group

(57) ABSTRACT

Methods and apparatus for providing soft and blind combining for PUSCH acknowledgement (ACK) processing. In an exemplary embodiment, a method includes soft-combining acknowledgement (ACK) bits received from a UE that are contained in a received sub-frame of symbols. The ACK bits are soft-combined using a plurality of scrambling sequences to generate a plurality of hypothetical soft-combined ACK bit streams. The method also includes receiving a parameter that identifies a selected scrambling sequence to be used. The method also includes decoding a selected hypothetical soft-combined ACK bit stream to generate a decoded ACK value, wherein the selected hypothetical soft-combined ACK bit stream is selected from the plurality of hypothetical soft-combined ACK bit streams based on the parameter.

20 Claims, 9 Drawing Sheets

(51) Int. Cl.
    *H04W 72/12*    (2009.01)
    *H04L 25/06*    (2006.01)
    *H04L 1/00*     (2006.01)

(52) U.S. Cl.
    CPC .......... *H04L 1/1664* (2013.01); *H04L 5/0057* (2013.01); *H04L 25/067* (2013.01); *H04W 72/121* (2013.01); *H04W 72/1268* (2013.01)

(58) Field of Classification Search
    CPC ...... H04L 25/067; H04L 1/16; H04W 72/121; H04W 72/1268; H04W 72/12; H04W 72/04; H04B 7/04; H04B 7/06; H04B 7/0478; H04B 7/0632; H04B 7/045
    See application file for complete search history.

(56) References Cited

U.S. PATENT DOCUMENTS

2014/0293932 A1* 10/2014 Papasakellariou .... H04L 1/0031
                                                    370/329
2016/0081094 A1*  3/2016 Han ................. H04L 25/03866
                                                    370/312

* cited by examiner

300 →

TABLE (1-BIT ACK ENCODING)

| $Q_M$ | ENCODED ACK |
|---|---|
| 2 | $[o_0^{ACK} \ y]$ |
| 4 | $[o_0^{ACK} \ y \ x \ x]$ |
| 6 | $[o_0^{ACK} \ y \ x \ x \ x \ x]$ |

TABLE (2-BIT ACK ENCODING)

| $Q_M$ | ENCODED ACK |
|---|---|
| 2 | $[o_0^{ACK} \ o_1^{ACK} \ o_2^{ACK} \ o_0^{ACK} \ o_1^{ACK} \ o_2^{ACK}]$ |
| 4 | $[o_0^{ACK} \ o_1^{ACK} \ x \ x \ o_2^{ACK} \ o_0^{ACK} \ x \ x \ o_1^{ACK} \ o_2^{ACK} \ x \ x]$ |
| 6 | $[o_0^{ACK} \ o_1^{ACK} \ x \ x \ x \ x \ o_2^{ACK} \ o_0^{ACK} \ x \ x \ x \ x \ o_1^{ACK} \ o_2^{ACK} \ x \ x \ x \ x]$ |

TABLE 3 (SCRAMBLING SEQUENCE FOR ACK BUNDLING)

| $i$ | $[\ w_0^{ACK} \ w_1^{ACK} \ w_2^{ACK} \ w_3^{ACK} \ ]$ |
|---|---|
| 0 | [ 1 1 1 1 ] |
| 1 | [ 1 0 1 0 ] |
| 2 | [ 1 1 0 0 ] |
| 3 | [ 1 0 0 1 ] |

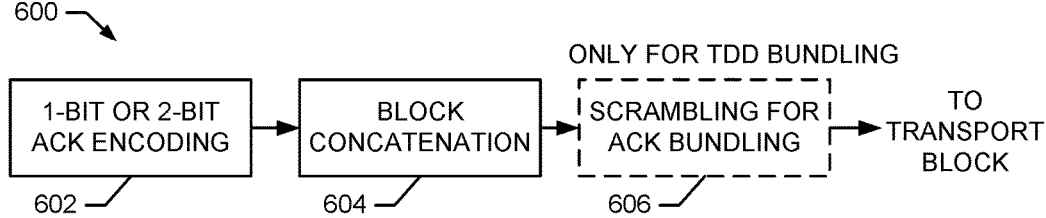

FIG. 6

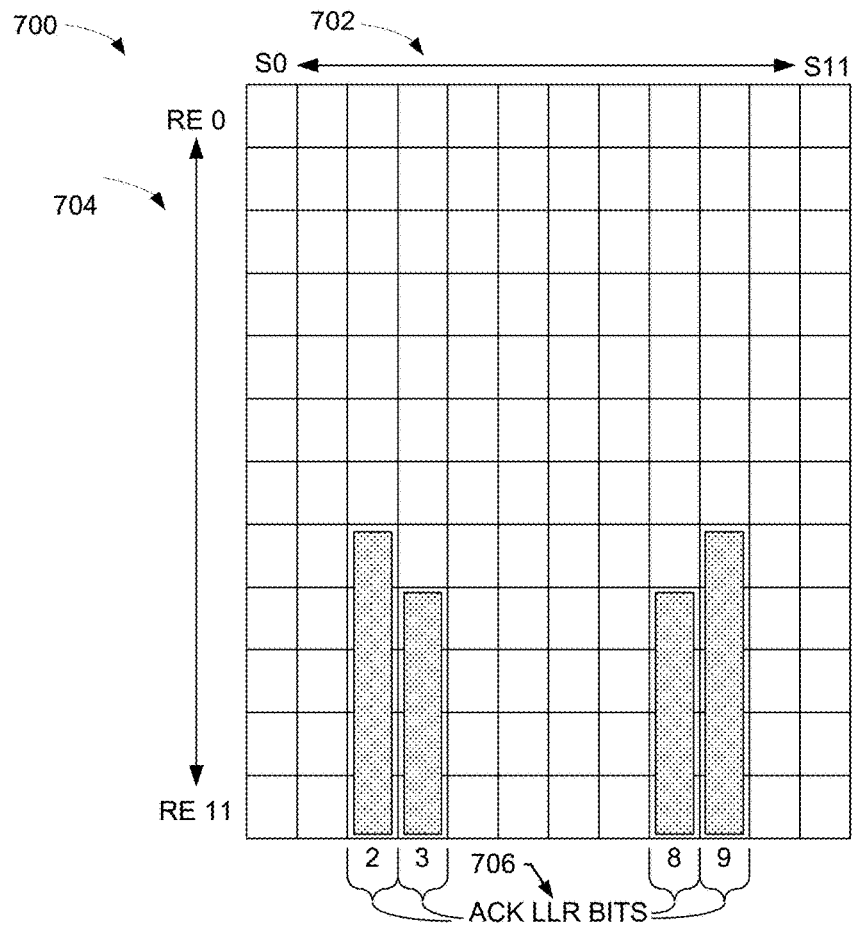

SCRAMBLING SEQUENCE FOR 1-BIT ACK MAPPING

| $w_0^{ACK} \ w_1^{ACK}$ | | | $w_2^{ACK} \ w_3^{ACK}$ |
|---|---|---|---|
| $w_0^{ACK} \ w_1^{ACK}$ | $w_2^{ACK} \ w_3^{ACK}$ | $w_0^{ACK} \ w_1^{ACK}$ | $w_2^{ACK} \ w_3^{ACK}$ |
| $w_0^{ACK} \ w_1^{ACK}$ | $w_2^{ACK} \ w_3^{ACK}$ | $w_0^{ACK} \ w_1^{ACK}$ | $w_2^{ACK} \ w_3^{ACK}$ |
| $w_0^{ACK} \ w_1^{ACK}$ | $w_2^{ACK} \ w_3^{ACK}$ | $w_0^{ACK} \ w_1^{ACK}$ | $w_2^{ACK} \ w_3^{ACK}$ |
| $w_0^{ACK} \ w_1^{ACK}$ | $w_2^{ACK} \ w_3^{ACK}$ | $w_0^{ACK} \ w_1^{ACK}$ | $w_2^{ACK} \ w_3^{ACK}$ |
| 2 | 3 | 8 | 9 |

FIG. 8B

2-BIT ACK MAPPING

| $o_2^{ACK} \ o_0^{ACK}$ | | | $o_1^{ACK} \ o_2^{ACK}$ |
|---|---|---|---|
| $o_0^{ACK} \ o_1^{ACK}$ | $o_0^{ACK} \ o_1^{ACK}$ | $o_1^{ACK} \ o_2^{ACK}$ | $o_2^{ACK} \ o_0^{ACK}$ |
| $o_1^{ACK} \ o_2^{ACK}$ | $o_1^{ACK} \ o_2^{ACK}$ | $o_2^{ACK} \ o_0^{ACK}$ | $o_0^{ACK} \ o_1^{ACK}$ |
| $o_2^{ACK} \ o_0^{ACK}$ | $o_2^{ACK} \ o_0^{ACK}$ | $o_0^{ACK} \ o_1^{ACK}$ | $o_1^{ACK} \ o_2^{ACK}$ |
| $o_0^{ACK} \ o_1^{ACK}$ | $o_0^{ACK} \ o_1^{ACK}$ | $o_1^{ACK} \ o_2^{ACK}$ | $o_2^{ACK} \ o_0^{ACK}$ |
| 2 | 3 | 8 | 9 |

FIG. 8C

SCRAMBLING SEQUENCE FOR 2-BIT ACK MAPPING

| $w_2^{ACK} \ w_3^{ACK}$ | | | $w_3^{ACK} \ w_3^{ACK}$ |
|---|---|---|---|
| $w_0^{ACK} \ w_0^{ACK}$ | $w_2^{ACK} \ w_2^{ACK}$ | $w_1^{ACK} \ w_1^{ACK}$ | $w_0^{ACK} \ w_1^{ACK}$ |
| $w_1^{ACK} \ w_1^{ACK}$ | $w_3^{ACK} \ w_3^{ACK}$ | $w_2^{ACK} \ w_3^{ACK}$ | $w_2^{ACK} \ w_2^{ACK}$ |
| $w_2^{ACK} \ w_3^{ACK}$ | $w_0^{ACK} \ w_1^{ACK}$ | $w_0^{ACK} \ w_0^{ACK}$ | $w_3^{ACK} \ w_3^{ACK}$ |
| $w_0^{ACK} \ w_0^{ACK}$ | $w_2^{ACK} \ w_2^{ACK}$ | $w_1^{ACK} \ w_1^{ACK}$ | $w_0^{ACK} \ w_1^{ACK}$ |
| 2 | 3 | 8 | 9 |

FIG. 8D

METHODS AND APPARATUS FOR PROVIDING SOFT AND BLIND COMBINING FOR PUSCH ACKNOWLEDGEMENT (ACK) PROCESSING

CLAIM TO PRIORITY

This application claims the benefit of priority based upon U.S. Provisional Patent Application having Application No. 62/267,221, filed on Dec. 14, 2015, and entitled "Method and Apparatus for Providing Soft and Blind Combining Techniques for PUSCH Baseband Processing," which is hereby incorporated herein by reference in its entirety.

FIELD

The exemplary embodiments of the present invention relate to telecommunications networks. More specifically, the exemplary embodiments of the present invention relate to receiving and processing data streams via a wireless communication network.

BACKGROUND

There is a rapidly growing trend toward mobile and remote data access over high-speed communication networks, such as provided by 3G or 4G cellular services. For example, using these services, users now rely on their smartphones for texting, access to email, banking, and social media, and for sending and receiving pictures and video.

Typically, wireless network performance depends in part on the quality of the transmission channel. For example, if the channel conditions are good, the network may perform with higher speed and capacity than when the channel conditions are poor. To obtain the best network performance, wireless networks may rely on user devices (e.g., user equipment "UE") to report control information back to the network. The control information includes parameters indicating the channel conditions and/or transmission parameters. One way user devices report control information back to the network is through a physical uplink shared channel (PUSCH). The network receives the control information over this shared channel and uses the received parameters to adjust data transmissions for optimum performance based on the network conditions indicated by the received parameters.

Acknowledgement information is also transmitted through the PUSCH. For example, after a user device receives a transmission from a network server, it generates an acknowledgement (ACK) that indicates whether or not the transmission was properly received. The ACK is then transmitted back to the network server through the PUSCH. The server can determine from the received ACK whether the transmission was properly received, and initiate a retransmission if necessary. In a time division duplex (TDD) communication system, the user device generates encoded ACK blocks that are scrambled with a scrambling sequence before transmission over the PUSCH for a TDD ACK bundling scenario. Typically, the scrambling sequence for TDD ACK bundling is selected from four or more possible scrambling sequences.

When the ACK information on the PUSCH is received at the network server, it is processed to obtain the actual ACK values. For example, the processing may include descrambling, soft-combining, and decoding of the received ACK information. In order to do this, conventional systems first determine the correct scrambling sequence for TDD ACK bundling that was used to scramble the ACK information. Once the exact scrambling sequence is determined, the process to recover the ACK information can be performed using that scrambling sequence to descramble the received information.

However, in conventional systems, additional parameters may need to be acquired and/or data processing may need to be performed before the exact scrambling sequence can be determined. Thus, conventional systems have to wait to perform these additional functions to determine the exact scrambling sequence before performing the operations needed to recover the ACK information, which may result in reduced network performance.

Therefore, it is desirable to have a mechanism that efficiently recovers received acknowledgement information and overcomes the problems associated with conventional systems.

SUMMARY

In various exemplary embodiments, methods and apparatus for providing soft and blind combining for PUSCH ACK processing are disclosed. For example, in a TDD communication system, user equipment generates encoded ACK blocks that are scrambled with a selected scrambling sequence (selected from multiple available scrambling sequences) before transmission over the PUSCH to a network server for the TDD ACK bundling case. In various exemplary embodiments, an ACK hypothesis generator operates at the network server to generate a hypothetical soft-combined ACK bit stream for each possible scrambling sequence. A decoder receives a calculated parameter that indicates the exact scrambling sequence and this indicator is used to select and decode the correct hypothetical ACK bit stream to generate a decoded ACK value. Generating a hypothetical soft-combined ACK bit stream for each possible scrambling sequence while the network parameter is being calculated speeds up ACK processing and results in improved network performance.

In an exemplary embodiment, a method is provided that includes soft-combining acknowledgement (ACK) bits received from a UE that are contained in a received sub-frame of symbols. The ACK bits are soft-combined using a plurality of scrambling sequences to generate a plurality of hypothetical soft-combined ACK bit streams. The method also includes receiving a parameter that identifies a selected scrambling sequence to be used. The method also includes decoding a selected hypothetical soft-combined ACK bit stream to generate a decoded ACK value, wherein the selected hypothetical soft-combined ACK bit stream is selected from the plurality of hypothetical soft-combined ACK bit streams based on the parameter.

In another exemplary embodiment, an apparatus is provided that includes a soft-combiner that soft-combines acknowledgement (ACK) bits received from a UE that are contained in a received sub-frame of symbols. The ACK bits are soft-combined using a plurality of scrambling sequences to generate a plurality of hypothetical soft-combined ACK bit streams. The apparatus also includes a decoder that receives a parameter that identifies a selected scrambling sequence to be used and decodes a selected hypothetical soft-combined ACK bit stream to generate a decoded ACK value. The selected hypothetical soft-combined ACK bit stream is selected from the plurality of hypothetical soft-combined ACK bit streams based on the parameter.

In another exemplary embodiment, an apparatus is provided that includes means for soft-combining acknowledgement (ACK) bits received from a UE that are contained in received sub-frame of symbols. The ACK bits are soft-combined using a plurality of scrambling sequences to generate a plurality of hypothetical soft-combined ACK bit streams. The apparatus also includes means for receiving a parameter that identifies a selected scrambling sequence to be used. The apparatus also includes means for decoding a selected hypothetical soft-combined ACK bit stream to generate a decoded ACK value. The selected hypothetical soft-combined ACK bit stream is selected from the plurality of hypothetical soft-combined ACK bit streams based on the parameter.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

FIG. 3 shows an exemplary Table that illustrates exemplary encoding of a 1-bit acknowledgment parameter;

FIG. 4 shows an exemplary Table that illustrates exemplary encoding of a 2-bit acknowledgment parameter;

FIG. 5 shows an exemplary Table that illustrates exemplary scrambling sequences used for ACK bundling;

FIG. 6 shows an exemplary embodiment of an exemplary process for preparing ACK bits to be included in a transport block;

FIG. 7 shows an exemplary subframe that includes resource elements containing acknowledgement LLR bits transmitted from a UE;

FIGS. 8A-D show exemplary embodiments of 1-bit and 2-bit mappings of encoded acknowledgement information and associated scrambling sequences;

DETAILED DESCRIPTION

Figure 1:
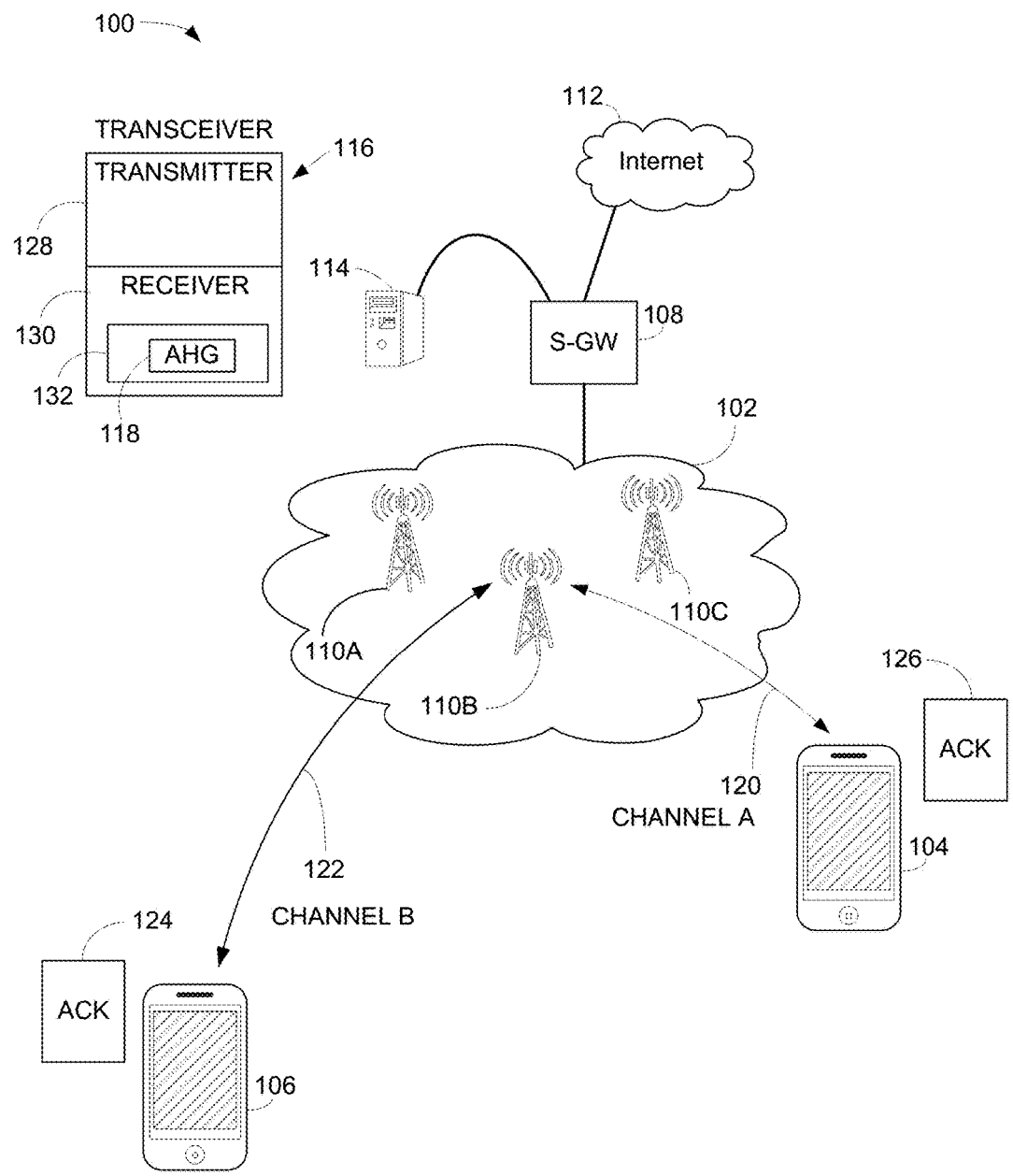
FIG. 1 shows a communication network comprising a transceiver having an exemplary embodiment of an ACK hypothesis generator configured to efficiently receive and process acknowledgement information from user equipment.

Aspects of the present invention are described herein in the context of methods and/or apparatus for processing control information relating to wireless data.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and/or business related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One aspect of the present invention discloses a device capable of hypothesizing possible ACK information in a wireless communications network. The process includes obtaining a subframe of symbols containing uplink ACK information via a physical uplink shared channel (PUSCH). Generating hypothetical soft-combined ACK bit streams for each possible scrambling sequence while a network parameter is calculated. After generating the hypothetical soft-combined ACK bit streams, they are stored in a local memory. In one embodiment, the calculated network parameter is used to select a particular hypothetical soft-combined ACK bit stream that is decoded to generate a decoded ACK value for output.

FIG. 1 shows a communication network 100 comprising a transceiver 116 having an exemplary embodiment of an ACK hypothesis generator (AHG) 118 configured to efficiently receive and process ACK information from user equipment. The network 100 may also be referred to as a third generation (3G), 4G, LTE, or combination of 3G and 4G cellular network configuration.

The communication network 100 includes a server 114 that includes the transceiver 116. The transceiver 116 has a transmitter portion 128 and a receiver portion 130. The server 114 is configured to communicate with a serving gateway (S-GW) 108 that is further configured to communicate with cell site 102 and the Internet 112. The cell site 102 includes radio towers 110 and associated base stations (not shown).

User equipment (UE) 104 is in communication with base station 110B using channel A 120 and user equipment 106 is in communication with base station 110B using channel B 122. For example, the UEs can be cellular phones, handheld devices, tablet computers or iPad® devices. It should be noted that the underlying concepts of the exemplary embodiments of the present invention would not change if one or more blocks (or devices) were added or removed from the communication network 100.

The receiver portion 130 includes receiver processing hardware (RPH) 132. In an exemplary embodiment, the RPH 132 includes the ACK hypothesis generator 118, which is used to facilitate efficient recovery of the ACK information received from UEs. To improve efficiency and/or speed for decoding ACK information in uplink transmissions received through a PUSCH via the network 100, one aspect of the present invention operates to soft-combine ACK information for all possible TDD ACK scrambling sequences or multiple scrambling sequences while at the same time a network parameter is calculated. The network parameter identifies the correct scrambling sequence that was used to scramble the received ACK information. Once the network parameter is calculated, the correct hypothetical soft-combined ACK bit stream can be selected and decoded to generate the decoded ACK value.

One advantage of using the AHG 118 is that the receiver portion 130 is able to recover the ACK information from the received subframe quickly to enhance overall efficiency of the receiver and the communication network 100.

Figure 2:
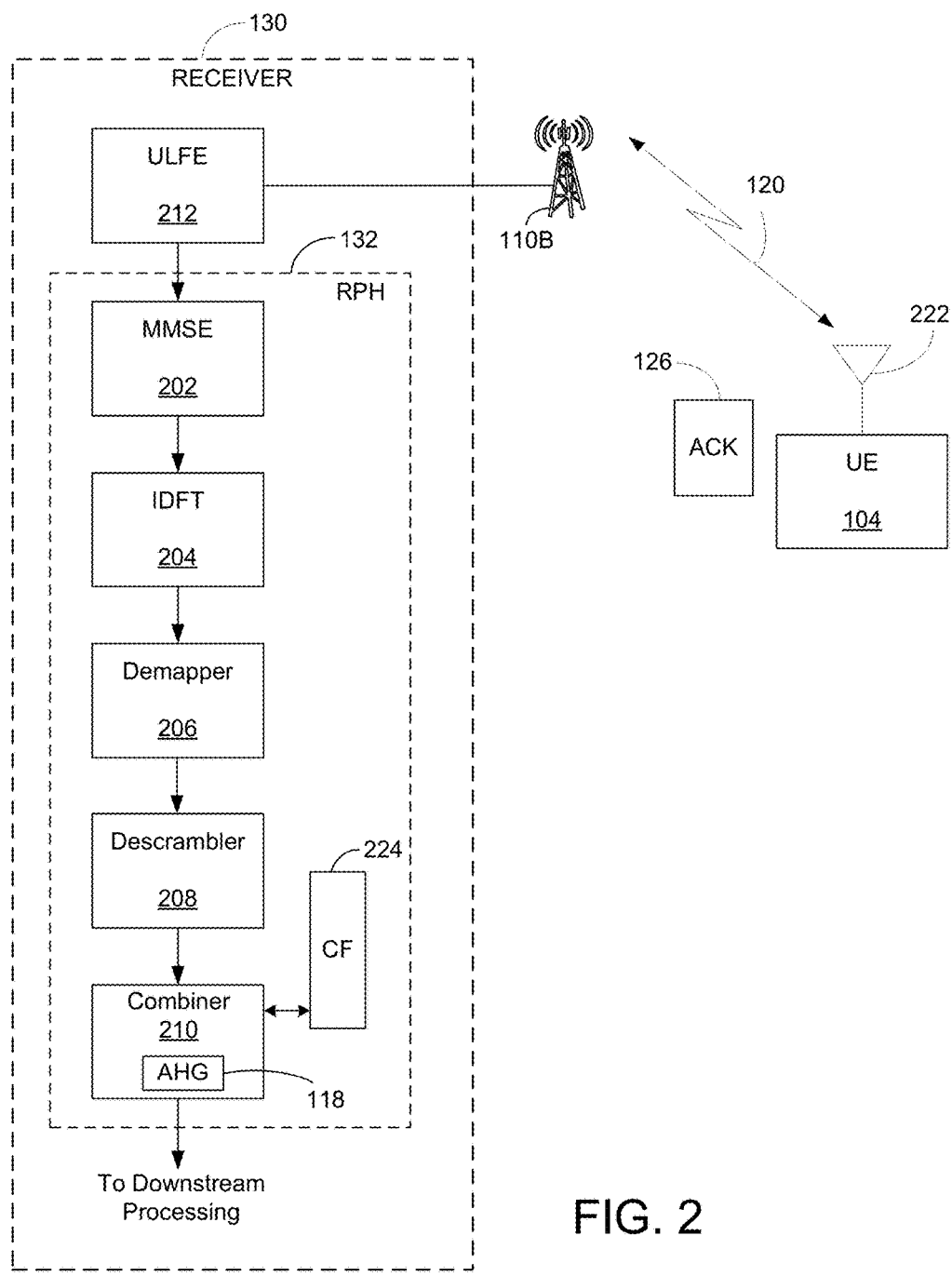
FIG. 2 shows a diagram illustrating an exemplary uplink transmission from a UE through a communication network to a receiver having an exemplary embodiment of the hypothetical ACK generator shown in FIG. 1.

FIG. 2 shows a diagram illustrating an exemplary uplink transmission from a UE through a communication network to a receiver having an exemplary embodiment of the ACK hypothesis generator 118. For example, the uplink transmission from the UE 104 flows through the communication network 100 to the receiver portion 130 of the transceiver 116. It will be assumed that the UE 104 generates the control information 126 and transmits this control information using antenna 222 to the tower 110B, as illustrated by transmission 120. In an exemplary embodiment, the control information 126 is transmitted over a PUSCH to the server 114. The uplink transmission flows to the receiver portion 130 of the transceiver 116. At the receiver portion 130, the uplink transmission is received at an uplink front end (ULFE) 212. After receiving the uplink transmission, the ULFE 212 passes received information to receiver processing hardware (RPH) 132.

The RPH 132, in one exemplary embodiment, includes MMSE 202, IDFT 204, demapper 206, descrambler 208 and combiner 210. In an exemplary embodiment, the RPH 132 includes configuration parameters (CF) 224 and the signal combiner 210 includes an exemplary embodiment of the AHG 118. The RPH 132 is configured to process information received by the ULFE 212 and the result of such processing is output to a decoder (not shown). The information includes user data and control information. The control information is used to facilitate information transmission over a wireless communication network, such as the network 100.

The MMSE 202, in one example, includes an equalizer with serial interference cancellation ("SIC") capability. The MMSE 202 generates estimated values using a function of mean-square-error or equalization of received signals or bit stream(s) during the signal processing phase. MMSE 202 also provides functionalities to equalize multiple streams of data received simultaneously over the air. For instance, the number of bit streams such as one (1) to eight (8) streams can arrive simultaneously.

The IDFT 204 converts symbols or samples between frequency domains. After conversion, the IDFT 204 may store the symbols or samples in a storage matrix (not shown). Depending on the application, the IDFT 204 passes the symbols to the next logic block, which is the demapper 206. The storage matrix is a local storage memory which can reside in the IDFT 204, the demapper 206, or at an independent storage location.

The Demapper 206 operates to demap or ascertain soft bit information associated with received symbol(s) or bit stream(s). For example, demapper 206 employs a soft demapping principle, which is based on computing the log-likelihood ratio (LLR) of a bit that quantifies the level of certainty as to whether it is a logical zero or one. To reduce noise and interference, the demapper 206 is also capable of discarding one or more unused constellation points relating to the frequency of the bit stream from the constellation map.

The descrambler 208 is configured to generate and descramble a sequence of bits or a stream of bits. For example, after generating a sequence in accordance with the input value, the descrambler determines whether sequence modification is needed for certain categories of control information. The stream of bits or sequence is subsequently descrambled to produce a set of descrambled soft bits.

The combiner 210 provides a combining function that combines LLR bits to form bit streams to be decoded. In an exemplary embodiment, the combiner 210 includes an exemplary embodiment of the ACK hypothesis generator 118. As disclosed in greater detail below, the AHG 118 operates to improve the speed and efficiency of the combiner 210 by providing for concurrent or simultaneous soft-combining of hypothetical ACK information while a network parameter is calculated. Once the network parameter is calculated, the correct hypothetical ACK bit stream can be selected and operations performed to recover a decoded ACK value from each UE in a faster and more efficient process. The resulting ACK value is passed to downstream processing.

The RPH 132 also includes CF 224 that provides configuration parameters to the various functions blocks of the RPH 132. Although the CF 224 is shown only in communication with the combiner 210, in various exemplary embodiment, the CF 224 communicates with other components of the RPH 132 to provide configuration parameters as necessary.

FIG. 3 shows an exemplary Table 300 that illustrates exemplary encoding of a 1-bit acknowledgment parameter. For example, in an exemplary embodiment, the Table 300 is used by user equipment to encode 1-bit acknowledgement information.

FIG. 4 shows an exemplary Table 400 that illustrates exemplary encoding of a 2-bit acknowledgment parameter. For example, in an exemplary embodiment, the Table 400 is used by user equipment to encode 2-bit acknowledgement information. Table 300 and 400 show ACK encoding for each modulation order $Q_m$.

The ACK parameter is encoded as binary 1 and means that a transmission was successfully received. A NACK parameter is encoded as binary 0 and means that a transmission was not successfully received. A third bit ($O_2^{ACK}$) is obtained from 2-bit information for the 2-bit ACK case as follows ($O_2^{ACK} = (O_0^{ACK} + O_1^{ACK}) \mod 2$).

In the Table 300 and the Table 400, the "y" and "x" bits are place holders and are used in the scrambling stage after the channel interleaver for repetition and for making sure that ACK information is carried by the highest power modulation symbols in the constellation.

Encoded ACK bits are subsequently repeated (rate matched) via block concatenation until the total number of bits reaches ($Q_{ACK} = Q'_{ACK} * Q_m$), where $Q'_{ACK}$ is the number of ACK symbols per layer and $Q_m$ is the modulation order. In the case of ACK bundling, there is an additional scrambling stage prior to obtaining the final bit sequence to be placed in the transport block.

FIG. 5 shows an exemplary Table 500 that illustrates exemplary scrambling sequences used for ACK bundling. Selection of the scrambling sequence (i) to be used is controlled by a parameter called $N_{bundled}$. Thus, based on the value of i the corresponding scrambling sequence is used to scramble rate matched ACK bits to obtain the final ACK bit sequence to be place in the transport block.

FIG. 6 shows an exemplary embodiment of a process 600 for preparing ACK bits to be included in a transport block. For example, in a first process, 1-bit or 2-bit ACK encoding is performed as shown at block 602. In a second process, rate matching is performed by a block concatenation process 604. In a third process that is only used for the case of ACK bundling, a scrambling process 606 is performed using the appropriate scrambling sequence that is determined by the $N_{bundled}$ parameter.

In an exemplary embodiment, the process 600 is reversed at the device receiving the transmit block in order to recover $O_0^{ACK}$, $O_1^{ACK}$, and $O_2^{ACK}$ successfully. Subcarriers of the relevant symbols of the received PUSCH subframe needs to be soft-combined as a part of the derate-matching process. This traditionally requires the exact knowledge of the scrambling sequence given by the index i of Table 500.

FIG. 7 shows an exemplary subframe 700 that includes resource elements containing acknowledgement LLR bits transmitted from a UE. For example, the subframe 700 comprises symbols 702 and resource elements (RE) 704. The bits indicated at 706 represent the ACK LLR bits received in the subframe 700 that are transmitted from a UE, such as UE 104.

The subframe 700 comprises twelve symbols 702 for each row of resource elements (RE) 704. In an exemplary embodiment, each symbol comprises bits representing two values. For example, as illustrated in the subframe 700, the ACK LLR bits appear in symbols 2 and 9 of resource elements 7-11 and symbols 3 and 8 of resource elements 8-11. It should be noted that the subframe 700 in FIG. 7 is exemplary and that other configurations with different numbers of REs, bits, and bit arrangements for the ACK information are possible.

FIGS. 8A-D show exemplary embodiments of 1-bit and 2-bit mappings of encoded acknowledgement information and associated scrambling sequence mappings. FIG. 8A shows an exemplary mapping of 1-bit ACK bits in the appropriate symbols and REs of the subframe 700. FIG. 8B shows an exemplary scrambling sequence mapping that can be used to descramble the 1-bit ACK mapping shown in FIG. 8A. FIG. 8C shows an exemplary mapping of 2-bit ACK bits in the appropriate symbols and REs of the subframe 700. FIG. 8D shows an exemplary scrabbling sequence mapping that can be used to descramble the 2-bit ACK mapping shown in FIG. 8C.

Figure 9:
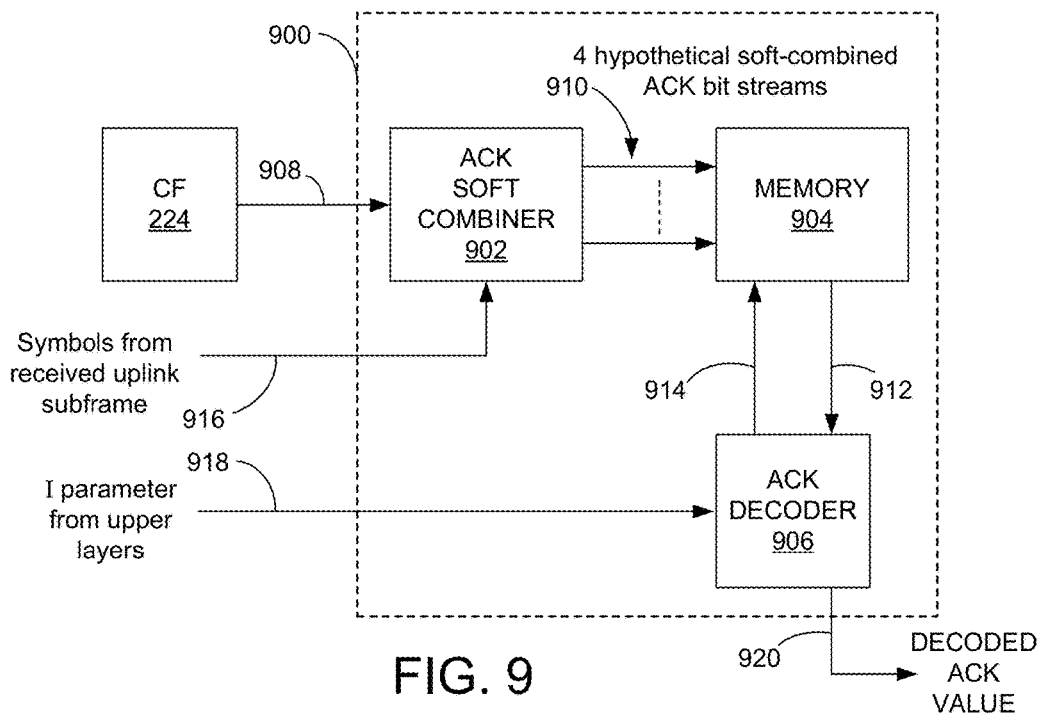
FIG. 9 shows a detailed exemplary embodiment of an ACK hypothesis generator.

FIG. 9 shows a detailed exemplary embodiment of an ACK hypothesis generator 900. For example, the AHG 900 is suitable for use as the AHG 118 shown in FIGS. 1-2.

The AHG 900 comprises ACK soft-combiner 902, memory 904, and ACK decoder 906. Although shown separately, the components of FIG. 9 also can be combined in any combination and/or arrangement within the scope of the embodiments. It should be noted that the underlying concept of the exemplary embodiments of the present invention would not change if one or more components were added or removed from the AHG 900 shown in FIG. 9.

The ACK hypothesis generator 900 operates to receive configuration parameter 906 and symbols from a received uplink subframe 916. The soft-combiner 902 operates to descramble and soft-combine ACK LLR bits in the received subframe according to the 1-bit mappings, 2-bit mappings, and corresponding descrambling sequence mappings shown above. In an exemplary embodiment, the ACK soft combiner 902 also receives configuration parameters 908 from the CF 224. In an exemplary embodiment, these parameters provide the possible TDD ACK bundling scrambling sequences (e.g., as shown in Table 500) that may be used by any particular UE. These parameters also may indicate how the ACK LLR bits in the REs are to be soft-combined. For example, the REs containing ACK bits may not be contiguous in the subframe and the parameters from the CF 224 may indicate the location of the REs to be used in the soft combining process. Thus, the ACK soft-combiner 902 carries out the ACK descrambling and soft-combining blindly for all scrambling sequences and doesn't require explicit information regarding the specific TDD ACK bundling scrambling sequence used by the UE.

The soft-combiner 902 generates four (4) hypothetical soft-combined ACK bit streams 910 corresponding to the four possible scrambling sequences and stores these ACK bit streams 910 into the memory 904. Thus, soft-combining is performed for all (or a plurality) of the possible scrambling sequences that may be used at the UE that transmitted the subframe.

While the hypothetical ACK bit streams are being generated, the network parameter I (that identifies the exact scrambling sequence) is computed by upper layers of the device that receives the subframe. The network parameter I is input to the ACK decoder 906.

The ACK decoder 906 receives the I parameter and uses this value to select the exact scrambling sequence and the corresponding hypothetical ACK bit stream to decode to obtain the correct ACK value. The ACK decoder 906 then sends a select request 914 to the memory 904 to retrieve the correct (selected) hypothetical ACK bit stream 912. Once the correct hypothetical ACK bit stream 912 is retrieve, the ACK decoder 906 decodes this bit stream to determine a decoded ACK value 920. For the case of a 1-bit ACK, the hypothetical ACK bit stream is the decoded ACK value 920 and is then output. For the case of a 2-bit ACK, the hypothetical ACK bit stream is decoded as described above to obtain the ACK value 920.

Figure 10:
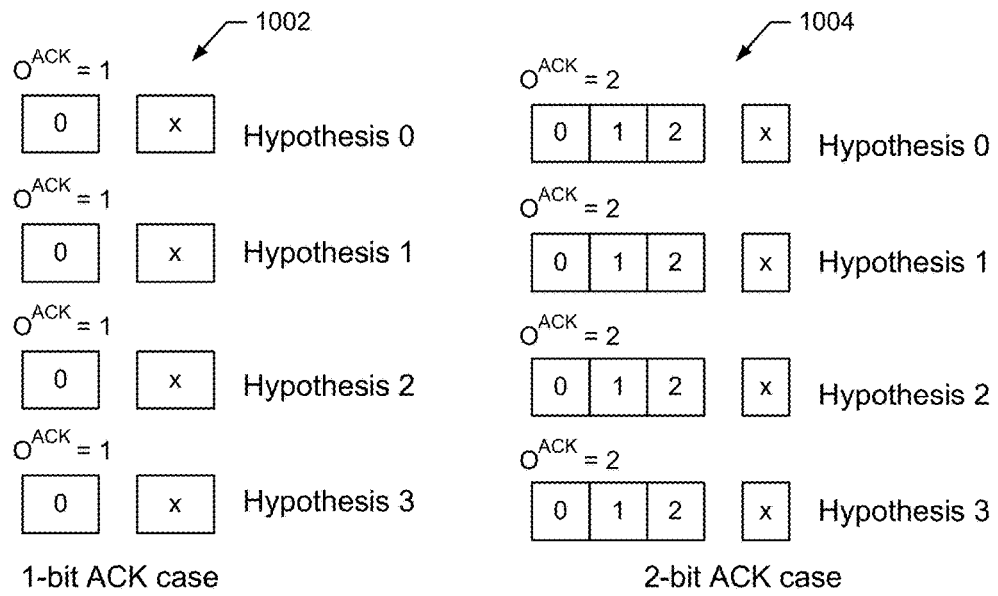
FIG. 10 shows exemplary hypothetical ACK values generated by an exemplary embodiment of an ACK hypothesis generator.

FIG. 10 shows exemplary hypothetical ACK values generated by the ACK hypothesis generator 902. In an exemplary embodiment, 4 ACK hypothesis are produced each corresponding to one row of Table 500. The generated output for both scenarios, namely the 1-bit and 2-bit cases are also shown in FIG. 10. For example, the 1-bit hypothesis values are shown at 1002 and the 2-bit hypothesis values are shown at 1004.

Figure 11:
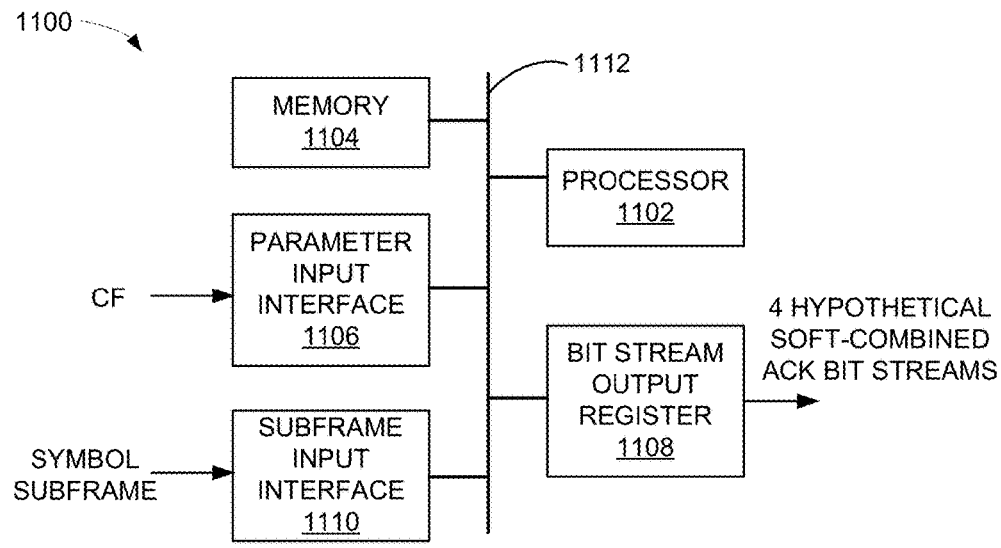
FIG. 11 shows a detailed exemplary embodiment of an ACK soft combiner that generates hypothetical acknowledgement values.

FIG. 11 shows a detailed exemplary embodiment of an ACK soft combiner 1100 that generates hypothetical acknowledgement values. For example, the ACK soft combiner 1100 is suitable for use as the ACK soft-combiner 902 shown in FIG. 9. The ACK soft combiner 1100 comprises processor 1102, memory 1104, parameter input register 1106, subframe input register 1110, and bit stream output register 1108, all communicating over bus 1112.

The parameter input register 1106 receives various configuration parameters and passes the received information to the processor 1102. For example, the configuration parameters include the possible scrambling sequences as shown in Table 500. The processor 1102 uses the received configuration parameters to determine whether the ACK encoding is 1-bit or 2-bits and the possible corresponding scrambling sequences. The subframe input register 1110 operates to receive symbols of a received subframe. For example, the symbols of the subframe 700 are input to the subframe input interface 1110.

The processor 1102 generates scrambling sequence mappings for each of the possible scrambling sequences. For example, for each of the 1-bit scrambling sequences the processor generates a scrambling sequence mapping table similar to the table in FIG. 8B and for each 2-bit scrambling sequence the processor 1102 generates a scrambling sequence mapping table similar to table in FIG. 8D.

The processor 1102 then applies the scrambling sequence mappings to the symbols in the received subframe to unscramble the data and then soft-combines the results to generate 4 hypothetical soft-combined ACK bit streams. For example, each of the soft-combined ACK bit streams corresponds to a particular scrambling sequence. The processor 1102 then outputs the 4 hypothetical soft-combined ACK bit streams from the bit stream output register 1108.

Thus, the ACK soft combiner 1100 operates to receive various configuration parameters (e.g., possible scrambling sequences) at the input register 1106, receive symbols of a subframe at input interface 1110, and generates the 4 hypothetical soft-combined ACK bit streams that are output from the bit stream output register 1108.

Figure 12:
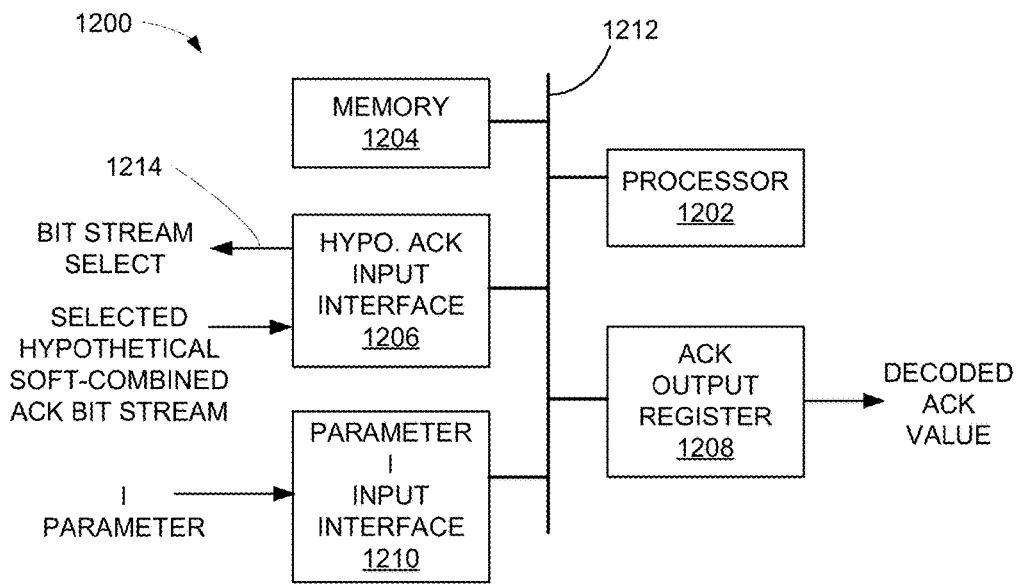
FIG. 12 shows a detailed exemplary embodiment of a decoder that decodes a selected hypothetical soft-combined ACK bit stream.

FIG. 12 shows a detailed exemplary embodiment of a decoder 1200 that decodes a selected hypothetical soft-combined ACK bit stream. For example, the decoder 1200 is suitable for use as the decoder 906 shown in FIG. 9. The decoder 1200 comprises processor 1202, memory 1204, parameter I input interface 1210, hypothetical soft-combined ACK bit stream interface 1206, and ACK output register 1208, all communicating over bus 1212.

The parameter I input interface 1210 receives the parameter I that is calculated by upper layers at the device and that indicates the correct scrambling sequence to be used to descramble and soft-combined the ACK LLR bits. The processor 1102 uses the received parameter I to determine which of the hypothetical ACK bit streams to decode. The processor 1202 controls the hypothetical ACK input interface 1206 to output a bit stream select signal 1214 that is input to the memory 904 to obtain the selected hypothetical soft-combined ACK bit stream. The processor 1202 then decodes this bit stream to generate a decoded ACK value that is output from the ACK output register 1208.

In an exemplary embodiment, if the selected hypothetical soft-combined ACK bit stream represents a 1-bit ACK, the processor 1202 passes this value directly to the ACK output register 1208. If the selected hypothetical soft-combined ACK bit stream represents a 2-bit ACK, the processor 1202 decodes this bit stream as describe above to determine the decoded ACK value to be output from the output register 1208. For example, in an exemplary embodiment, the soft-combined bit stream is decoded according to ($O_2^{ACK}$ = ($O_0^{ACK}$+$O_1^{ACK}$)mod 2) to determine the decoded ACK value to be output.

Thus, the decoder 1200 operates to receive a calculated parameter I and uses this parameter to select the correct hypothetical soft-combined ACK bit stream stored in the memory 904. This bit stream is then decoded to generate a decoded ACK value that is output from the register 1208.

Figure 13:
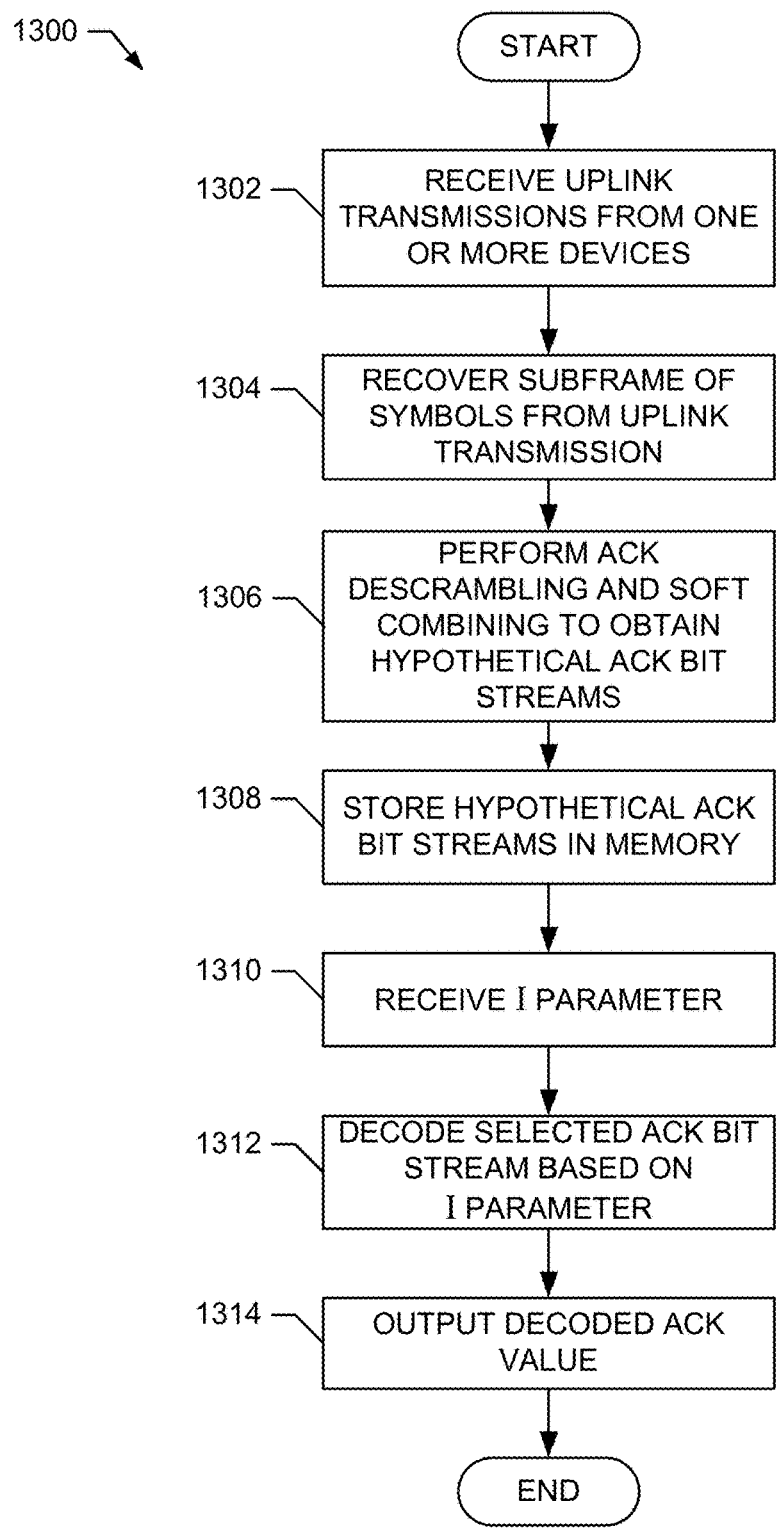
FIG. 13 shows an exemplary method for efficiently generating hypothetical soft-combined ACK bits streams to decode an ACK value in accordance with an exemplary embodiment of the present invention.

FIG. 13 shows an exemplary method for determining an ACK value by generating hypothetical soft-combined ACK bits streams using an exemplary embodiment of a ACK hypothesis generator in accordance with an exemplary embodiment of the present invention.

At block 1302, an uplink transmission is received from one or more UEs. For example, uplink transmissions are received at the server 114 from the devices 104, 106 shown in FIG. 1. The uplink transmission includes ACK information, such as ACK information 126, 124 received at the server 114 in a PUSCH.

At block 1304, a subframe of symbols is recovered from the uplink transmission. For example, the RHP 132 shown in FIG. 2 receives the uplink transmissions at the ULFE 212 and processes the transmissions using the MMSE 202, IDFT 204, demapper 206 and descrambler 208 to generate the subframe of received symbols that are input to combiner 210. For example, the subframe 700 having ACK LLR bits 706 is generated.

At block 1306, ACK descrambling and soft-combining is performed. For example, the soft-combiner 1100 performs descrambling and soft-combining of the ACK LLR bits in the subframe to generate a separate hypothetical soft-combined ACK bit stream for each possible scrambling sequence as described above.

At block 1308, the hypothetical soft-combined ACK bit streams are stored in a memory. For example, hypothetical soft-combined ACK bit streams are stored the in the memory 904.

At block 1310, a parameter I is received from upper layers at the device. For example, the upper layer compute or determine the I parameter which indicates the correct scrambling sequence to be used to descramble the ACK LLR bits. In an exemplary embodiment, the I parameter is received at the ACK decoder 906.

At block 1312, based on the received I parameter, the correct hypothetical soft-combined ACK bit stream is decoded to form a decoded ACK value. For example, the ACK decoder 906 receives the I parameter 918 and uses this value to retrieve a particular hypothetical soft-combined ACK bit stream from the memory 904 and decodes this bit stream to generate the decoded ACK value.

At block 1314, the decoded ACK value is output. For example, the decoder 906 outputs the decoded ACK value 920 to downstream processes.

Thus, the method 1300 operates to efficiently determine an ACK value by generating hypothetical soft-combined ACK bits streams using an exemplary embodiment of a ACK hypothesis generator in accordance with an exemplary embodiment of the present invention.

Figure 14:
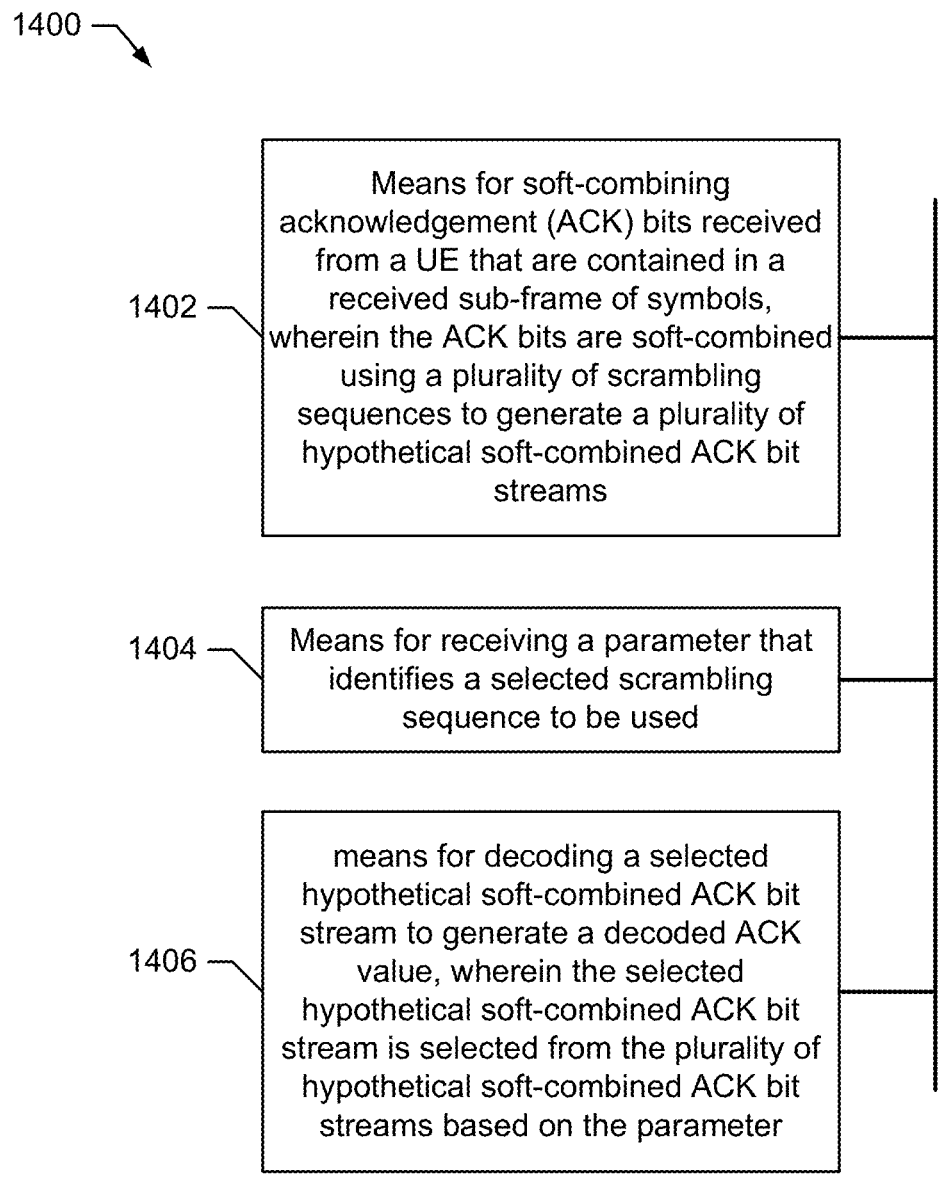
FIG. 14 shows an exemplary embodiment of an apparatus that efficiently generates hypothetical soft-combined ACK bits streams to decode an ACK value in accordance with an exemplary embodiment of the present invention.

FIG. 14 shows an exemplary embodiment of an apparatus 1400 that efficiently determines an ACK value by generating hypothetical soft-combined ACK bits streams in accordance with an exemplary embodiment of the present invention.

The apparatus 1400 includes means 1402 for soft-combining acknowledgement (ACK) bits received from a UE that are contained in a received sub-frame of symbols. The ACK bits are soft-combined using a plurality of scrambling sequences to generate a plurality of hypothetical soft-combined ACK bit streams, which in an exemplary embodiment comprises the soft-combiner 902.

The apparatus 1400 also includes means 1404 for receiving a parameter that identifies a selected scrambling sequence to be used, which in an exemplary embodiment comprises the decoder 906.

The apparatus 1400 also includes means 1406 for decoding a selected hypothetical soft-combined ACK bit stream to generate a decoded ACK value, wherein the selected hypothetical soft-combined ACK bit stream is selected from the plurality of hypothetical soft-combined ACK bit streams based on the parameter, which in an exemplary embodiment comprises the decoder 906.

Thus, the apparatus 1400 operates to efficiently determines an ACK value by generating hypothetical soft-combined ACK bits streams in accordance with an exemplary embodiment of the present invention.

The exemplary aspect of the present invention includes various processing steps as described above. The steps may be embodied in machine or computer executable instructions. The instructions can be used to cause special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those skilled in the art that, based upon the teachings herein, changes and modifications may be made without departing from these exemplary embodiments and their broader aspects. Therefore, the appended claims are intended to encompass within their scope all such changes and modifications as are within the true spirit and scope of these exemplary embodiments of the present invention.

What is claimed is:

1. A method for operating a receiver to decode an acknowledgement received in a wireless communication from user equipment (UE), the method comprising:
    soft-combining acknowledgement (ACK) bits received from the UE that are contained in a received sub-frame of symbols, wherein the ACK bits are soft-combined using a plurality of scrambling sequences to generate a plurality of hypothetical soft-combined ACK bit streams, respectively;
    receiving a parameter that identifies a selected scrambling sequence to be used; and
    decoding a selected hypothetical soft-combined ACK bit stream to generate a decoded ACK value, wherein the selected hypothetical soft-combined ACK bit stream is selected from the plurality of hypothetical soft-combined ACK bit streams based on the parameter.

2. The method of claim 1, wherein the decoding comprises:
    determining when the selected hypothetical soft-combined ACK bit stream represents a 1-bit ACK; and
    outputting the selected hypothetical soft-combined ACK bit stream as the decoded ACK value, when it is determined that the selected hypothetical soft-combined ACK bit stream represents a 1-bit ACK.

3. The method of claim 1, wherein the decoding comprises:
    determining when the selected hypothetical soft-combined ACK bit stream represents a 2-bit ACK;
    decoding the selected hypothetical soft-combined ACK bit stream to determine the decoded ACK value, when it is determined that the selected hypothetical soft-combined ACK bit stream represents a 2-bit ACK; and
    outputting the decoded ACK value.

4. The method of claim 3, wherein the decoding comprises decoding a two bit ACK value according to an equation expressed as (O2ACK=(O0ACK+O1ACK) mod 2).

5. The method of claim 1, further comprising storing the plurality of hypothetical soft-combined ACK bit streams in a memory.

6. The method of claim 1, further comprising receiving the subframe of symbols in an uplink transmission from the UE.

7. The method of claim 6, wherein the uplink transmission comprises a long term evolution (LTE) uplink transmission.

8. The method of claim 6, wherein the uplink transmission is received over a physical uplink shared channel ("PUSCH").

9. The method of claim 1, further comprising performing the method for a plurality of UE.

10. An apparatus for use in a receiver to decode an acknowledgement received in a wireless communication from user equipment (UE), the apparatus comprising:
    a soft-combiner having a subframe interface that receives sub-frame symbols containing acknowledgement (ACK) bits, the soft-combiner also having a memory that stores a plurality of scrambling sequences, and the soft-combiner also having a processor that soft-combines the received ACK bits using the plurality of scrambling sequences stored in the memory to generate a plurality of hypothetical soft-combined ACK bit streams, respectively; and
    a decoder having a parameter interface to receive a parameter that identifies a selected scrambling sequence, the decoder having a hypothetic ACK interface that receives a selected hypothetical soft-combined ACK bit stream that is selected from the plurality of hypothetical soft-combined ACK bit streams based on the parameter, and the decoder having a processor that decodes the selected hypothetical soft-combined ACK bit stream to generate a decoded ACK value.

11. The apparatus of claim 10, wherein the decoder determines when the selected hypothetical soft-combined ACK bit stream represents a 1-bit ACK, and outputs the selected hypothetical soft-combined ACK bit stream as the decoded ACK value, when it is determined that the selected hypothetical soft-combined ACK bit stream represents a 1-bit ACK.

12. The apparatus of claim 10, wherein the decoder determines when the selected hypothetical soft-combined ACK bit stream represents a 2-bit ACK, and decodes the selected hypothetical soft-combined ACK bit stream to determine the decoded ACK value, when it is determined that the selected hypothetical soft-combined ACK bit stream represents a 2-bit ACK.

13. The apparatus of claim 12, wherein the decoder decodes a two bit ACK value according to an equation expressed as (O2ACK=(O0ACK+O1ACK) mod 2).

14. The apparatus of claim 10, further comprising a memory that stores the plurality of hypothetical soft-combined ACK bit streams.

15. The apparatus of claim 10, wherein the subframe of symbols is received in an uplink transmission from the UE.

16. The apparatus of claim 15, wherein the uplink transmission comprises a long term evolution (LTE) uplink transmission.

17. The apparatus of claim 15, wherein the uplink transmission is received over a physical uplink shared channel ("PUSCH").

18. An apparatus for use in a receiver to decode an acknowledgement received in a wireless communication from user equipment (UE), the apparatus comprising:
   means for soil-combining acknowledgement (ACK) bits received from the UE that are contained in a received sub-frame of symbols, wherein the ACK bits are soft-combined using a plurality of scrambling sequences to generate a plurality of hypothetical soft-combined ACK bit streams, respectively;
   means for receiving a parameter that identifies a selected scrambling sequence to be used; and
   means for decoding a selected hypothetical soft-combined ACK bit stream to generate a decoded ACK value, wherein the selected hypothetical soft-combined ACK bit stream is selected from the plurality of hypothetical soft-combined ACK bit streams based on the parameter.

19. The apparatus of claim 18, wherein the means for decoding comprises:
   means for determining when the selected hypothetical soft-combined ACK bit stream represents a 1-bit ACK; and
   means for outputting the selected hypothetical soft-combined ACK bit stream as the decoded ACK value, when it is determined that the selected hypothetical soft-combined ACK bit stream represents a 1-bit ACK.

20. The apparatus of claim 18, wherein the means for decoding comprises:
   means for determining when the selected hypothetical soft-combined ACK bit stream represents a 2-bit ACK;
   means for decoding the selected hypothetical soft-combined ACK bit stream to determine the decoded ACK value, when it is determined that the selected hypothetical soft-combined ACK bit stream represents a 2-bit ACK; and
   means for outputting the decoded ACK value.

* * * * *